United States Patent
Cheu et al.

[19]

[11] Patent Number: 6,040,085
[45] Date of Patent: *Mar. 21, 2000

[54] BATTERY PACKAGING

[75] Inventors: S. Scot Cheu; Russell D. Moulton, both of San Jose, Calif.

[73] Assignee: Valence Technology, Inc., Henderson, Nev.

[*] Notice: This patent is subject to a terminal disclaimer.

[21] Appl. No.: 08/811,146

[22] Filed: Mar. 4, 1997

Related U.S. Application Data

[63] Continuation-in-part of application No. 08/221,437, Mar. 31, 1994, Pat. No. 5,670,272.

[51] Int. Cl.[7] ...................................................... H01M 6/12
[52] U.S. Cl. ............................ 429/185; 429/54; 429/66; 429/162; 429/163
[58] Field of Search ............................... 429/66, 54, 162, 429/127, 177, 185, 163

[56] References Cited

U.S. PATENT DOCUMENTS

| | | | |
|---|---|---|---|
| 3,543,662 | 12/1970 | Erlichman | 95/11 |
| 3,630,783 | 12/1971 | Przybyla . | |
| 3,899,355 | 8/1975 | Chiklis | 136/111 |
| 3,937,635 | 2/1976 | Mead et al. . | |
| 4,028,479 | 6/1977 | Fanciullo et al. . | |
| 4,060,669 | 11/1977 | Fanciullo . | |
| 4,060,670 | 11/1977 | Tamminen . | |
| 4,080,728 | 3/1978 | Buckler . | |
| 4,098,965 | 7/1978 | Kinsman . | |
| 4,105,807 | 8/1978 | Arora . | |
| 4,137,627 | 2/1979 | Kinsman . | |
| 4,152,825 | 5/1979 | Brunneau . | |
| 4,207,389 | 6/1980 | Gunther et al. . | |
| 4,209,479 | 6/1980 | Gunther et al. . | |
| 4,233,371 | 11/1980 | Dorrestijn . | |
| 4,429,026 | 1/1984 | Bruder . | |
| 4,477,545 | 10/1984 | Akridge et al. . | |
| 4,507,857 | 4/1985 | Epstein et al. . | |
| 4,525,439 | 6/1985 | Simonton . | |
| 4,547,438 | 10/1985 | McArthur et al. . | |
| 4,664,993 | 5/1987 | Sturgis et al. . | |
| 4,752,540 | 6/1988 | Chua et al. . | |
| 4,816,354 | 3/1989 | Tamminen . | |
| 4,883,726 | 11/1989 | Peled et al. . | |
| 4,887,348 | 12/1989 | Tamminen . | |
| 4,911,993 | 3/1990 | Turley et al. . | |
| 4,927,717 | 5/1990 | Turley et al. . | |
| 4,997,732 | 3/1991 | Austin et al. . | |
| 5,008,161 | 4/1991 | Johnston . | |
| 5,066,555 | 11/1991 | Tamminen . | |
| 5,089,027 | 2/1992 | Rossoll et al. . | |
| 5,409,787 | 4/1995 | Blanyer | 429/66 |
| 5,670,272 | 9/1997 | Cheu et al. . | |

*Primary Examiner*—John S. Maples
*Attorney, Agent, or Firm*—Young & Basile, P.C.

[57] ABSTRACT

The subject invention discloses apparatus and methods to provide compression of an electrochemical cell independent of atmospheric pressure. One aspect of this invention is directed towards a lithium ion cell assembly which is surrounded by a layer of material under tension, so that the material applies pressure which compresses the cell to enhance contact between the anode, separator, and cathode layers. Specifically, a heat shrink material (material which reduces in size, or contracts in at least one dimension of a three-dimensional conformation, due to the application of heat) is provided about a laminar battery and shrunk in situ to provide a battery package. Another embodiment of this invention is directed towards a lithium ion cell asembly in which a sealed package contains both the battery and a spring element. The spring element within the package applies pressure to the battery to compress it and improve contact between the anode, separator, and cathode layers.

30 Claims, 5 Drawing Sheets

BATTERY PACKAGING

REFERENCE OF RELATED APPLICATION

This application is a continuation in part of U.S. application Ser. No. 08/221,437, filed Mar. 31, 1994, now issued as U.S. Pat. No. 5,670,272.

TECHNICAL FIELD

The present invention relates to the manufacture of battery assemblies and more specifically solid state packaging for laminar lithium ion batteries which provide a compression means for the cell stacks.

BACKGROUND OF THE INVENTION

Lithium ion cells are the newest of the commercially available battery cells. They are higher in energy density per unit weight than silver oxide, mercury or alkaline dry cells and are one of the best performers at very high and low temperatures. Lithium cells also have a longer shelf life than many other batteries and thus have been the choice for many in battery design. A typical laminar lithium ion cell battery includes an anode of lithium metal or of a lithium insertion compound; a separator structure or electrolyte film layer; a cathode including electrochemical active material, typically a chalcogenide of a transition metal; and an electrolyte prepared from an inorganic lithium salt dissolved in an organic solvent. These batteries are well-known in the art and examples of such are set forth in U.S. Pat. Nos. 4,997,732; 5,456,000.

During discharge, lithium ions from the anode pass through the liquid electrolyte to the electrochemically active material of the cathode, where the ions are taken up with the simultaneous release of electrical energy. During charging, the flow of ions is reversed so that lithium ions pass from the electrochemically active cathode material through the electrolyte and are plated back onto the lithium anode.

Numerous technical problems are encountered, however, in the construction of solid state electrochemical cells, particularly in the establishment of electrode/separator and electrode/current collector interfaces. Failure to establish satisfactory interfaces may manifest itself in high cell impedance and poor discharge performance. The low electrode impedances required for good battery performance can be enhanced by bringing the planar surfaces of the various layers into intimate contact with their adjoining layers. The prior art method to secure adequate contact is to seal the battery under vacuum, so that compression of the battery cell is achieved by atmospheric pressure.

U.S. Pat. No. 4,997,732 to Austin et al., describes a known method of compressing the stacks of a battery cell. A layer of insulating envelope material is sealed around the battery cell under a vacuum. This enables the envelope material to adhere to the laminar cell to prevent the cell from moving within the sealed enclosure. The vacuum sealed cell envelope helps prevent delamination of the component layers. The vacuum inside the cell layers results in a pressure differential across the envelope so that the atmospheric pressure brings the electrodes into intimate contact with the electrolyte.

Problems with this solution occur if the vacuum inside the cell envelope is reduced. If the pressure differential across the envelope is reduced substantially, the pressure differential applied to the cell components will no longer be adequate to produce the compression force needed to insure component contact. Vacuum reduction is not uncommon and may occur for a number of reasons. For example, vacuum reduction may occur from gas formation due to impurities inside the cell envelope or from leakage of the envelope due to puncture.

In devices where the vacuum is successfully maintained, other problems may still occur. The vacuum inside the sealed packaging producing the pressure differential also acts as a driving force to push outside air into the cell when the envelope is punctured. Because metallic lithium is reactive with all environmentally present gases and vapors other than noble gases, it is particularly susceptible to contamination by, or reactivity with, environmental materials.

U.S. Pat. No. 5,456,000, which is incorporated by reference in its entirety, discloses the formation of electrolytic cell electrodes and separator elements. The electrodes and separator elements use a combination of a poly(vinylidene fluoride) copolymer matrix and a compatible organic solvent plasticizer to provide battery component layers, each in the form of a flexible, self-supporting film.

Figure 1:
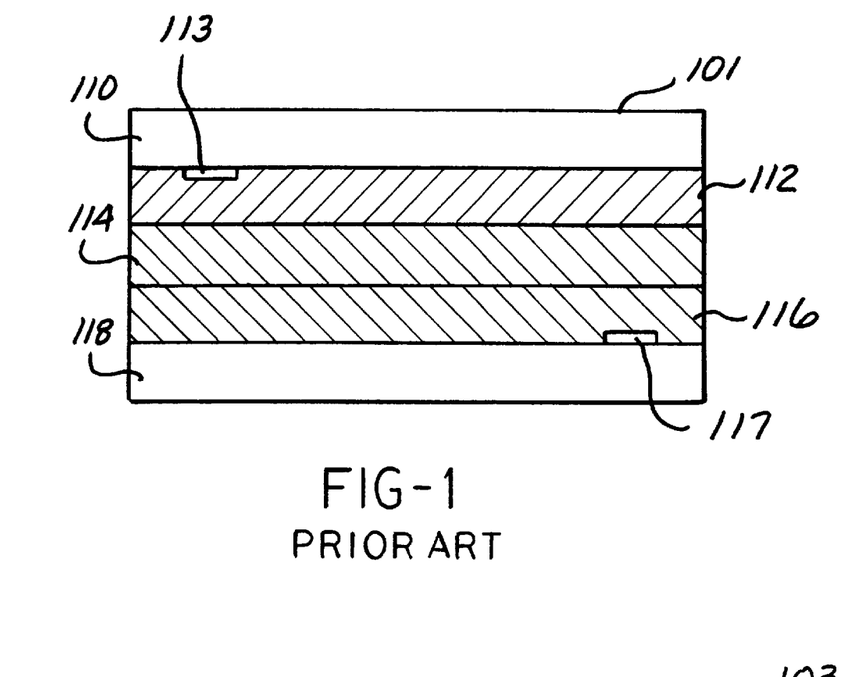
FIG. 1 is a cross-sectional view of a conventional laminar lithium ion cell.

An electrolytic cell precursor, such as a rechargeable battery cell precursor, is constructed by means of the lamination of electrode and separator cell elements which are individually prepared. Each of the electrodes and the separator is formed individually, for example by coating, extrusion, or otherwise, from compositions including the copolymer materials and a plasticizer. The materials are then laminated as shown in FIG. 1.

In the construction of a lithium-ion battery, for example, a copper grid may comprise the anodic current collector 110. An anode (negative electrode) membrane 112 is formed by providing an anodic material dispersed in a copolymer matrix. For example, the anodic material and the copolymer matrix can be provided in a carrier liquid, which is then volatilized to provide the dried anode membrane 112. The anode membrane 112 is positioned adjacent the anodic current collector 110.

A separator membrane 114 is formed as a sheet of a copolymeric matrix solution and a plasticizer solvent. The separator membrane 114 is placed adjacent the anode membrane 112.

A cathode (positive electrode) membrane 116 is similarly formed by providing a cathodic material dispersed in a copolymer matrix. For example, the cathodic material and the copolymer matrix can be provided in a carrier liquid, which is then volatilized to provide the dried cathode membrane 116. The cathode membrane 116 is then overlaid upon the separator layer 114, and a cathodic current collector 118 is laid upon the cathode membrane.

The assembly is then heated under pressure to provide heat-fused bonding between the plasticized copolymer matrix components and the collector grids. A unitary flexible battery precursor structure is thus produced. Generally, the plasticizer is removed using a solvent such as ether or hexane. This produces a "dry" battery precursor substantially free of plasticizer and which does not include any electrolytic solvent or salt. An electrolytic solvent and electrolyte salt solution is imbibed into the "dry" battery copolymer membrane structure to yield a functional battery system.

There is a need to protect lithium ion battery components from environmental materials, and to protect the environment from both the battery materials and from byproducts of battery operation. Batteries of the prior art have been sealed under vacuum and/or placed in protective housings to provide a barrier between the battery and the environment. The effectiveness of a vacuum seal can be compromised by either variations in the ambient pressure, or a buildup of gaseous or liquid byproducts within the package.

Physical contact between individual layers of the battery (for example, the anode/separator interface, the cathode/separator interface, and the electrode/current collector interfaces) may be incomplete, or gapped, leading to reduced battery performance.

SUMMARY OF THE INVENTION

In view of the above shortcomings associated with the prior art, there is a need for a battery packaging system which does not rely on vacuum packaging, and which enhances physical contact between individual layers of the battery. The invention herein provides compression of an electrochemical cell which is independent of atmospheric pressure.

One aspect of this invention is directed towards a lithium ion cell assembly that includes a laminar battery having an anode layer, a cathode layer, and an ionically conductive separator layer between the anode and cathode layers. The assembly also includes a layer of material under tension, surrounding and in contact with the battery, so that it applies pressure which holds together the laminar battery and compresses it to enhance contact between the cell layers. Specifically, a heat shrink material (material which reduces in size, or contracts in at least one dimension of a three-dimensional conformation, due to the application of heat) is provided about a laminar battery and shrunk in situ. The compressive force improves contact between the cell components irrespective of the atmospheric pressure surrounding it.

If additional physical protection is desired, the battery assembly can be placed within a package. The package encloses the battery and the compressive material. If desired, further compression can be provided by a spring element within the package.

Another aspect of this invention is directed towards a lithium ion cell assembly which includes a laminar battery having an anode layer, a cathode layer, and a separator layer between the anode and cathode layers. The assembly provides a closed housing that contains both the battery and a spring element. The spring element within the closed housing applies pressure to the laminar battery, which compresses it to improve contact between the various layers. The spring element may be a coil spring, leaf spring, wave washer spring, a polymer foam spring, an inflatable air spring, or the like. In one embodiment, the cell assembly also includes a "floating" panel structure which is between the spring element and the laminar battery.

Another aspect of this invention is directed towards a method of packaging a lithium ion battery to produce the above embodiments. One method includes the steps of wrapping an electrochemical cell unit with a heat shrink material and heating the material so that the material tightens around the cell, producing a compressive force on it. Another method provides a housing which contains both an electrochemical cell and a compressive spring element.

BRIEF DESCRIPTION OF THE DRAWINGS

The above and other features and aspects of the present invention will become more apparent upon reading the following detailed description. The Figures are drawn for clarity and are not drawn to scale. Similar numbers refer to similar structures throughout the Figures.

FIG. 9b is a perspective view of the cell of FIG. 9a inserted into a cylindrical material for closing and sealing the cell to illustrate the embodiment of FIG. 9a.

DETAILED DESCRIPTION OF THE INVENTION

In describing the invention, specific terminology will be used for clarity. However, the invention is not limited to the specific terms so selected. It is to be understood that each specific term selected includes all technical equivalents which operate in a similar manner to accomplish a similar purpose.

Generally, an electrochemical cell or lithium ion battery of the subject invention has a negative electrode side, a positive electrode side, and a separator (preferably a polymeric film) therebetween. Specifically, a cell of the subject invention includes an anode and a cathode, and, interposed functionally therebetween, an ion-permeable separator. An electrolyte consisting of an inorganic salt and an electrolytic solvent is permeated throughout the structures of each of the anode, the cathode, and the interposed separator film.

An electrochemical cell precursor is formed when an anode film, a separator (polymeric matrix) film, and a cathode film are laminated together. Each of the anode and the cathode may include a current collector. The cell precursor is activated when an inorganic salt and an electrolytic solvent are placed within the porous portions of the cell precursor. After the electrochemical cell has been activated it is charged using an external energy source prior to use.

An electrolytic cell precursor, such as a rechargeable battery cell precursor, is constructed by means of the lamination of electrode and separator film cell elements which are individually prepared. Each of the electrodes and the separator is formed individually, for example by coating, extrusion, or otherwise, from compositions including the copolymer materials and a plasticizer. The materials are then laminated as shown in FIG. 1.

With reference again to FIG. 1, there is shown a cross-sectional view of a typical laminar lithium ion cell 101. In the construction of a lithium-ion battery, for example, a copper grid may comprise the anodic current collector 110. An anode (negative electrode) membrane 112 is formed by providing an anodic material dispersed in a copolymer matrix. For example, the anodic material and the copolymer matrix can be provided in a carrier liquid, which is then volatilized to provide the dried anode membrane 112.

Anode active materials are well known in the art, and include, by way of example, lithium; lithium alloys such as alloys of lithium with aluminum, mercury, manganese, iron, or zinc; intercalation based anodes such as those using carbon or tungsten oxides; and the like. Preferred anodes include lithium intercalation anodes employing carbon materials such as graphite, cokes, mesocarbons, and the like. The anode 112 may also include an electron conducting material such as carbon black. Carbon intercalation based anodes, such as those suitable for use in the subject invention, include a polymeric binder. That is, a solid polymeric matrix provides part of the structure of the anode.

The anodic electrode of the subject invention usually comprises an anode film 112 laminated onto one or both sides of the anodic current collector 110. Preferably a copper foil sheet, open mesh, expanded metal, woven or non-woven or knitted wire fabric or grid is used as the anodic current collector 110. Materials suitable for anodic current collectors are known to the art, and are usually comprised of an electron conductive material such as metals or alloys. Typical materials include nickel, iron, stainless steel, or copper. Each current collector is also connected to a current collector tab which extends from the edge of the current collector. In batteries comprising multiple electrochemical cells, the anode tabs are preferably welded together and connected to a nickel lead. External loads can be electrically connected to the leads. An adhesion promoter can be used to facilitate bonding between the anode material and the anodic current collector. An anode terminal 113 can be, for example, copper or nickel.

A separator structure 114 is formed as a sheet of a copolymeric matrix solution and a plasticizer solvent. The separator structure 114 is commonly used to space the anode 112 and the cathode 116 apart from one another, while allowing free transmission of ions from one electrode to the other. A separator structure may be formed from commercially available separators made of glass fiber, porous polypropylene or porous polyethylene. Such separators include Type A/E glass fiber filters (Gelman Sciences, Ann Arbor, Mich.), and Celgard (Hoechst-Celanese Corp., N.Y., N.Y.). The separator is preferably a solid polymeric matrix, such as a polymeric separator film. Suitable polymeric separator film provide a porous structure, permeated with a plasticizer, upon curing or casting. Preferred polymeric separator films are produced using a casting process in which a carrier liquid is removed to form a flexible sheet. An alternate preferred method produces polymeric separator films by extrusion processes. See, for example, U.S. Pat. Nos. 4,247,499; 4,388,385; 4,394,280; 4,432,891; 4,414,506; 4,539,276; 4,557,985; 4,925,751; 4,925,752; 4,990,413; 5,011,501; 5,326,653; and 5,456,000; each of which is incorporated herein by reference.

A cathode (positive electrode) membrane 116 is similarly formed by providing a cathodic material dispersed in a copolymer matrix. For example, the cathodic material and the copolymer matrix can be provided in a carrier liquid, which is then volatilized to provide the dried cathode membrane 116. The cathode membrane 116 is then overlaid upon the separator layer 114, and a cathodic current collector 118 is laid upon the cathode membrane. A cathode terminal 117 is in contact with the cathode layer 116.

Cathode active materials are known to the art, and include insertion compounds, i.e., any material which functions as a positive pole in a solid electrolytic cell. Cathodic materials include, by way of example, transition metal oxides, sulfides, and selenides. Such materials include oxides of cobalt, manganese, molybdenum, and vanadium; sulfides of titanium, molybdenum, and niobium; the various chromium oxides; copper oxides; and lithiated oxides of cobalt, manganese and nickel; and the like. Cathodic materials include $Li_xMn_2O_4$, $LiCoO_2$, $LiNiO_2$, $LiCo_{0.5}Ni_{0.5}O_2$, and the like. The cathodic material is mixed with an electroconductive material such as graphite, powdered carbon, powdered nickel, metal particles, conductive polymers, and the like.

A cathode generally includes a current collector 118 laminated with a positive electrode active film material 116 on one or both sides. Preferably an aluminum foil sheet, open mesh, expanded metal, woven or non-woven or knitted wire fabric or grid is used. Materials suitable for cathodic current collectors are known to the art, and are typically comprised of an electron conductive material such as metals or alloys. The cathode current collector is typically of aluminum, stainless steel, and such foils having a protective conductive coating foil. Each current collector 118 is also connected to a current collector tab which extends from the edge of the current collector. An adhesion promoter can be used to facilitate bonding between the cathode material and the cathodic current collector.

The anode/separator/cathode assembly is heated under pressure to provide heat-fused bonding between the plasticized copolymer matrix of the separate components and the collector grids. A unitary flexible battery precursor structure is thus produced. Plasticizer can be removed from the battery precursor by extraction or displacement methods of the prior art. The battery precursor is then activated by the introduction of an electrolyte solution which includes an electrolytic solvent and an electrolyte salt.

Because many electrolyte salts are sensitive to moisture or other chemical compounds, the activation of the electrolytic cell precursor preferably takes place in an inert, moisture-free atmosphere, such as under an argon atmosphere. Electrolytic cells and cell precursors are preferably packaged for storage in moisture-impermeable packaging.

Figure 2:
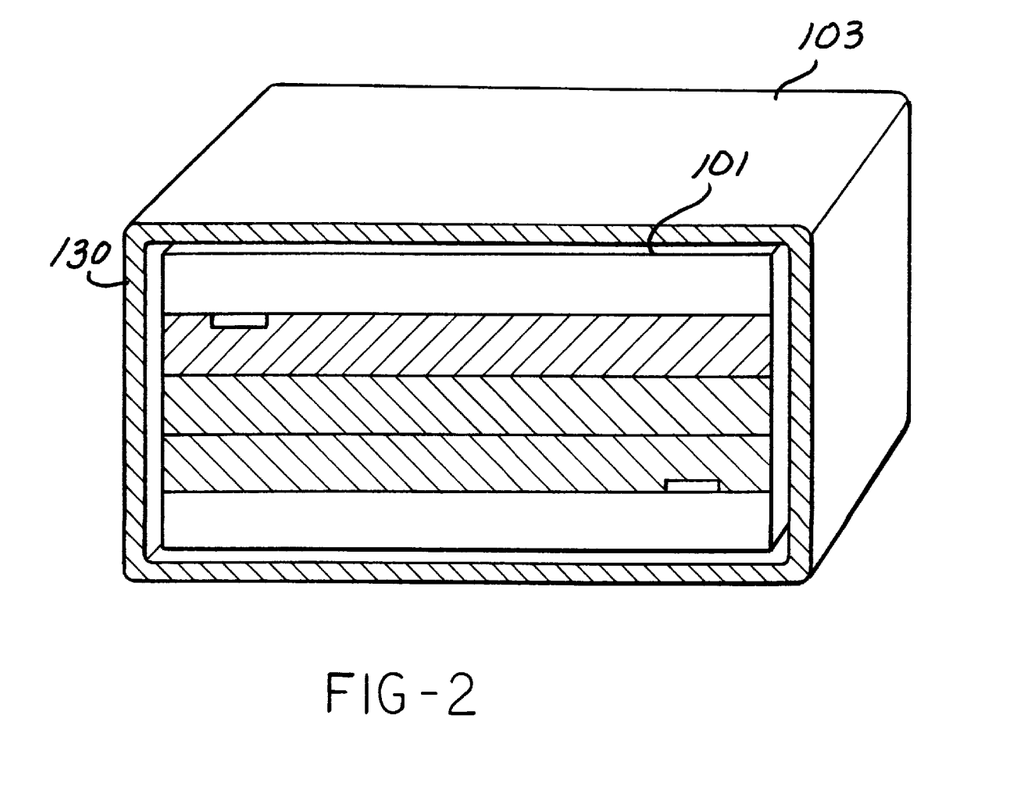
FIG. 2 is a cross-sectional view of an embodiment of the present invention which uses a heat shrink material as a means for providing compressive force against the components in the cell assembly to illustrate one embodiment of the invention. In the Figure, the heat shrink material is positioned about the cell, but heat has not yet been applied to contract the material.

FIG. 2 shows a cross-sectional view of a battery assembly 103 to illustrate a first embodiment of this invention. The heat shrink material 130 surrounding the electrolytic cell 101 is pictured prior to the heating and the contraction of the material. An electrochemical cell 101 is inserted into a tube or cylinder of heat shrink material. Alternatively, heat shrink material 130 is wrapped around the electrochemical cell 101. The heat shrink material can be, for example, PVC, PVDC, or TEFLON™. The material may be in tube or film form. Typically when using a tube, material with an appropriate shrink ratio is fitted around the cell unit 101. Specific suitable types of polyolefin tubes that may be used include the MW, EPS-200, EPS-300, and EPS-400 Tubing from 3M Electrical/Electronic, Austin, Tex.

After applying heat to the entire tube, the material shrinks to a fraction of its original size. Commonly, the shrinkage is limited to specific aspects or dimensions of the material. For example, upon heating of a heat shrink tube, it is common for the diameter of the tube to be significantly reduced, while the length of the tube changes very little or not at all. For example, EPS-200 tubes shrink to approximately ½ of the original diameter, EPS-300 to ⅓, EPS-400 to ¼th, and MW to ⅖ of the original diameter. Heat shrink material will contract until it meets resistance such as that provided by the boundaries of an enclosed battery cell or other object. The heat shrink material will continue to constrict, compressing the enclosed object as the material continues to contract. The shrinkage is chosen such that a desirable force is applied to the cell stack in the two major sides with which it is in contact. Heat may be applied by running the fitted cell through an oven, or by blowing hot air onto it. It is preferred that a material with a low threshold shrinkage temperature be used. This allows shrinkage to occur without having to heat the battery cell for a prolonged period of time at a high temperature. Ideally, shrinkage occurs immediately at a low temperature. EPS-200, EPS-300 and EPS-400 Tubing each have threshold shrinkage temperatures above 121° C.

Heat shrink materials are to be distinguished from those materials which are merely heat sealable, or flow sealable. A plastic material which is heat-sealable is brought to or above the melting point (such as for melt processing). In contrast, heat-shrink plastics are heated to a temperature which is below the melting point, but at which point the material transitions from a first (expanded) configuration to a second (contracted) configuration. Heat-shrinkability is provided by processing of appropriate plastics to provide a first, dimensionally stable low-temperature configuration. Once heat is applied, the material "shrinks", or contracts in at least one dimension, to assume a second configuration, which is also dimensionally stable at low temperature. The transition temperature for heat shrinkability is not the same as, and is generally significantly less than, the melt temperature and/or the decomposition temperature of the material.

After a tube of heat shrink material has been contracted to apply constrictive pressure upon the battery cell on the two major sides with which it is in contact, the tube may be trimmed, if necessary, and sealed, if desired. For example, heat-shrink material may also be sealable at the tube ends using melt-flow processing or other processing steps.

Even though a heat shrink material 130 is used in the embodiment described, it will be understood that any material that can be placed in tension may be used to apply sufficient compressive force to hold the different layers of the cell together, thus making vacuum sealing an option rather than a requirement.

In the various embodiments in which the anode, separator, cathode, and collector layers are pictured as flat, planar layers, the assembled battery structure may possess sufficient planar strength that the compression of the heat-shrink material only exerts an effective force to press the various layers together. However, if the assembled battery structure has insufficient planar rigidity, the compression of the heat shrink material could cause the layers to buckle, thereby undesirably reducing the areas of contact between the different layers. If such layers are to be maintained in a flat configuration, the layers are integrated with one or more rigid planar member. In a preferred embodiment, the battery assembly is sandwiched between two rigid panels (not shown) before the entire assembly is wrapped in the heat shrink material. When the material is shrunk to exert a force on the assembly, the rigid panels limit the compressive force of the heat-shrink material to the desired compression configuration, and promotes electrical contact between the layers.

Figure 3:
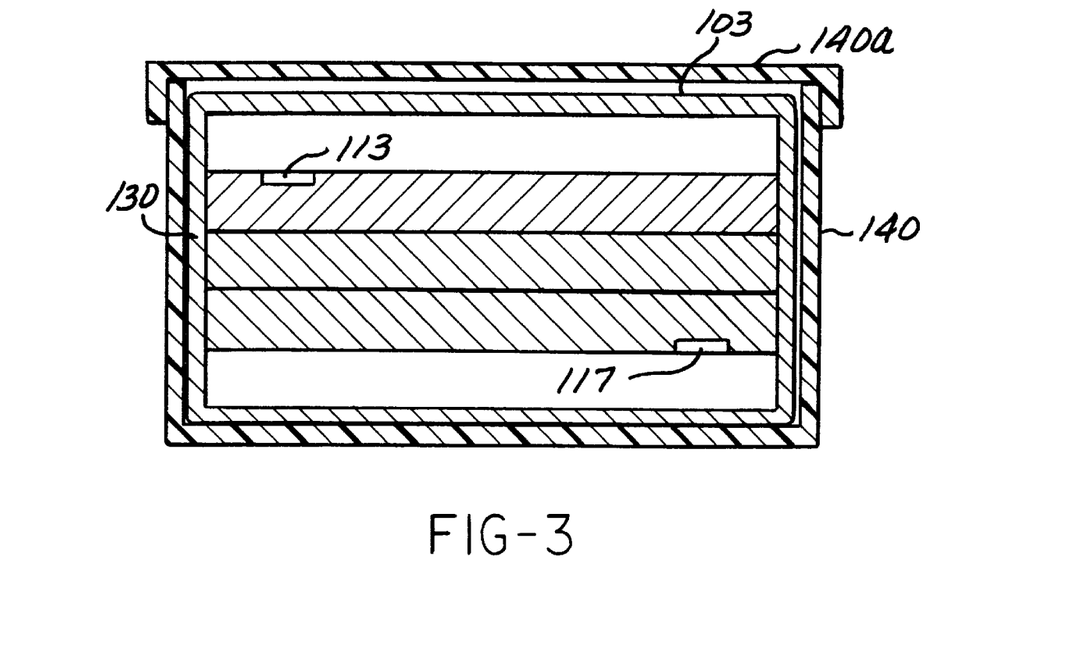
FIG. 3 is a cross-sectional view of the embodiment of FIG. 2 inside an additional protective package.

FIG. 3 shows a cross-sectional view of a heat-treated, compressed cell unit 103 of FIG. 2 inserted inside a protective housing structure 140. The housing serves to protect the battery components from contamination by outside air. The housing 140 shown in FIG. 3 may be a can, box, or battery bag, for example. It may be of any desired shape or material, including aluminum, alloys, plastics, or battery bags of plastic-foil composition. Of course, if electroconductive materials are used in the housing, they must be electrically isolated from undesired electrical contact with the enclosed battery. The housing 140 may include a sealing lid structure 140a, as shown, or it may be sealed without the use of a separate lid.

Preferably, the heat shrink material 130 alone provides sufficient compressive forces to hold the cells together, thus making vacuum sealing within the housing 140 an option rather than a requirement. Alternately, after inserting the wrapped cell unit 103 inside the protective housing 140, the housing may be flushed with an inert gas before sealing. Of course, the terminals 113 and 117 extend out of the housing structure 140 (not shown), so that contact can be made between them and outside connectors for drawing power from the battery; such extension and connection are known to those in the art and are not shown in the figures or explained in detail herein.

Figure 4:
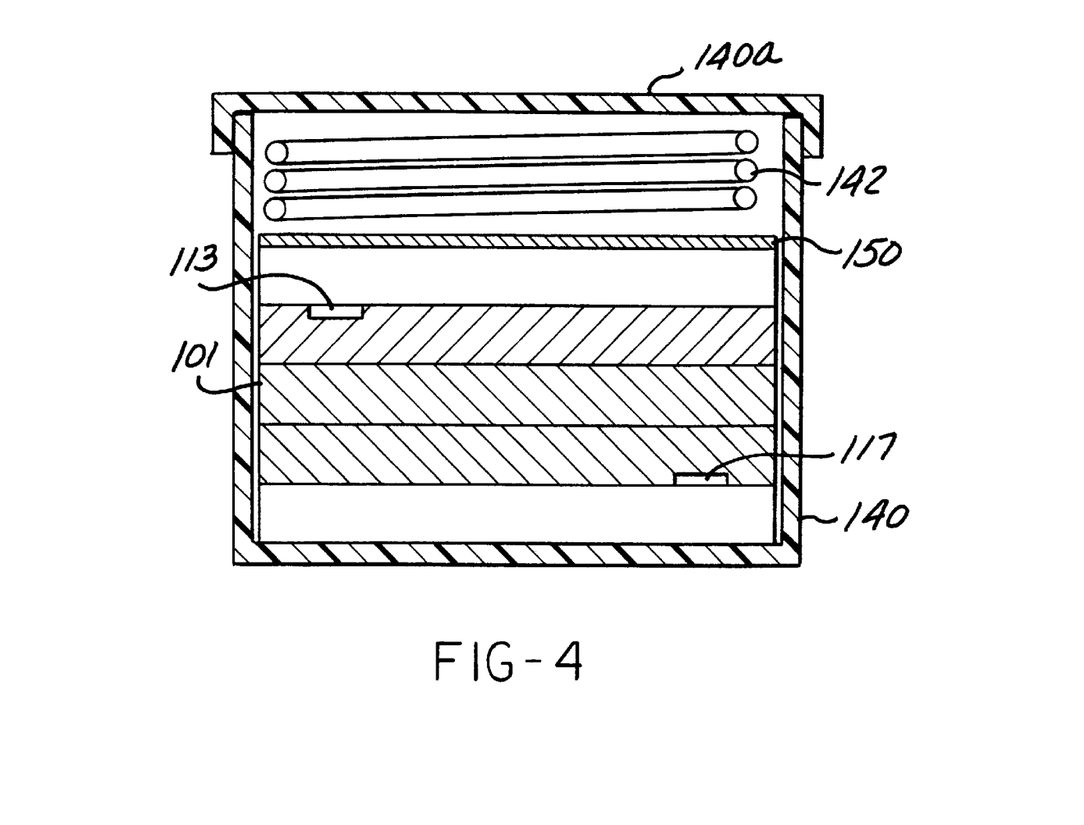
FIG. 4 is a cross-sectional view of a second embodiment of the present invention which uses a coil spring as a means for providing compressive force against the components in the cell assembly.

In an alternate embodiment (not shown), the compressed cell unit 103 is placed in a housing structure having a spring element 142 such as that of FIG. 4. This provides additional compression of the battery.

FIG. 4 shows a cross-sectional view of an alternate embodiment of this invention. In this embodiment, a spring element 142 is used to provide compressive force to promote contact between the layers of the battery. In FIG. 4, the lithium ion cell 101 of FIG. 1 is placed in a protective can or housing 140. A floating panel 150 may be placed within the housing 140, directly adjacent the battery cell 101. The floating panel 150 has a limited range of motion, as it is situated between the laminar cell 101 and the spring element 142. It serves to distribute force evenly across the surface of the laminar cell 101 and prevents localization of pressure. The floating panel 150 also prevents the spring from piercing the cell 101.

The floating panel 150 can be made of a plastic, such as polypropylene, or a metal such as aluminum, appropriately insulated as necessary. A spring element 142 is loosely placed above the floating panel 150. The spring element 142 may be of coil, leaf, or wave washer form, for example, and may be constructed of steel, of an alloy exhibiting high elasticity, or of an electrically nonconductive material such as polypropylene or anodized aluminum. The protective housing structure 140 may either be vacuum sealed or flushed with an inert gas prior to sealing. When the housing structure 140 is closed, the housing top 140a pushes the spring element 142 inward, compressing the spring 142, which in turn produces a compressive force on the floating panel 150 (if present) and the battery assembly 101. This compressive force is provided to hold the anode, separator, cathode and collector layers in the battery cell together, and to enhance contact between the layers. Thus, no vacuum sealing of the protective battery housing 140 is required. Again, the terminals 113, 117 will protrude from the can or housing 140 without breaking the seal by means well known to those skilled in the art.

Figure 5:
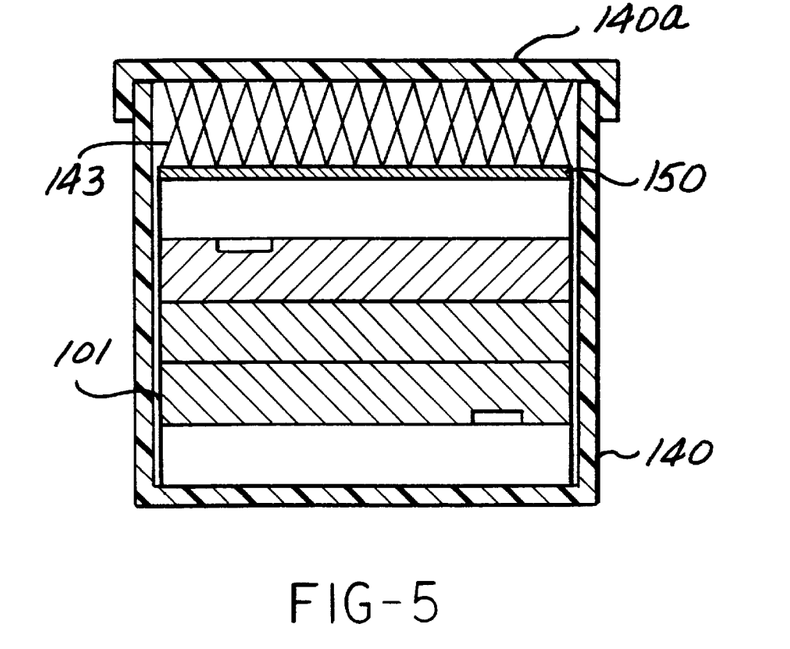
FIG. 5 is a cross-sectional view of a third embodiment of the present invention which uses a polymer foam spring as a means for providing compressive force against the components in the cell assembly.

FIG. 5 shows a cross-sectional view of another embodiment of the present invention, which includes a polymer foam spring element 143 as a means for providing compressive force to the components of the battery assembly. Urethane foam or a similar elastomer is one example of a polymer element that can be used. As in the previous embodiment, a floating panel 150 can be used, if desired, to distribute force evenly across the cell assembly 101 placed inside a protective housing 140. A polymer spring element 143 is placed directly adjacent the floating panel 150. As in the previous embodiment, when the housing 140 is sealed, the housing top 140a compresses the spring element 143 and biases it toward the battery cell 101. The spring element 143 in turn produces a compressive force on the floating panel 150 and the battery assembly 101. The compressive force is provided to be sufficient to hold the different component layers of the battery cell together, and to provide good physical contact between them. As in the previous embodiment, no vacuum sealing of the protective battery housing 140 is required.

Figure 6:
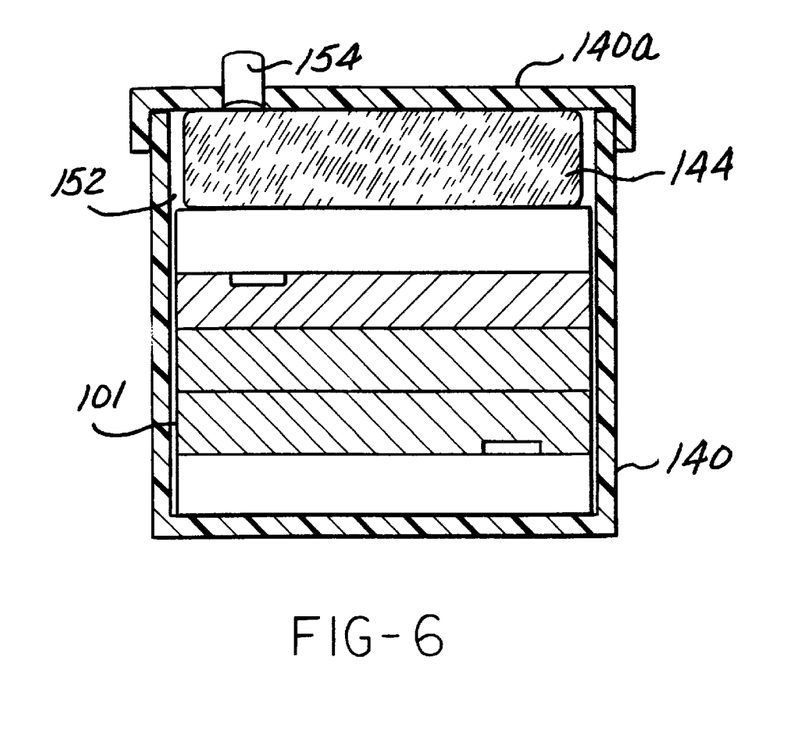
FIG. 6 is a cross-sectional view of a fourth embodiment of the present invention which uses a polymer spring formed from an uncured compound which is injected into a balloon structure located in the dead space between the top of the protective can and the floating panel structure.

FIG. 6 shows yet another embodiment of the present invention. In this embodiment, an uncured compound (not shown) is injected into a space 152 between the housing top 140a of the protective housing structure 140 and the top of the battery assembly 101, all inside housing structure 140. The housing 140 is sealed after being flushed with an inert gas or, optionally, vacuum-sealed. After the package is sealed, an expanding compound 144 is injected through a nozzle or plug 154 in the housing lid 140a into the dead space 152 of the package. Typically, the expandable compound is made from two or more elements, one being an activator element. The two elements may be premixed and injected together into the nozzle opening 154, or the two may be injected separately. An example of a compound that may be used is polystyrene, which is known to those in the art. After the injection, the nozzle opening 154 is crimped and soldered. The injected compound will have properties which cause it, with curing, to expand over time or when heated.

As the compound 144 expands, pressure is exerted on the cell assembly 101. This pressure from the expanding compound is sufficient to promote physical contact between the layers. Thus, no vacuum sealing of the protective battery can is required.

In yet another embodiment of this invention, not shown, an air bag or balloon is deployed in the dead space, and the expandable compound described above is injected inside the air bag or balloon located in the dead space of the protective can package. The air bag or balloon may be formed using a bladder element inside the package with a neck portion extending through a hole (located, for example, as nozzle 154 is in FIG. 6) in the housing lid. The injection is made through the neck portion. After the injection is made, sealing of the bag can be accomplished outside the package.

In still another embodiment of this invention, not pictured, a gas is injected inside an air bag or balloon located in the dead space of the protective housing. The air bag serves as an inflatable spring which exerts a compressive force on the cell member. In a modification of the embodiment described above in reference to FIG. 5, the foam spring 143 may also be inserted into an air bag or balloon before it is placed in the dead space between the housing lid 140a and floating panel 150.

Figure 7A:
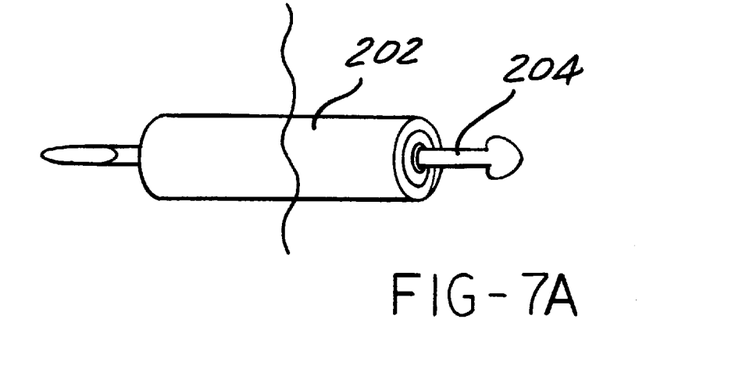
FIGS. 7a and 7b are schematic views of one embodiment of a self closing valve.
Figure 7B:
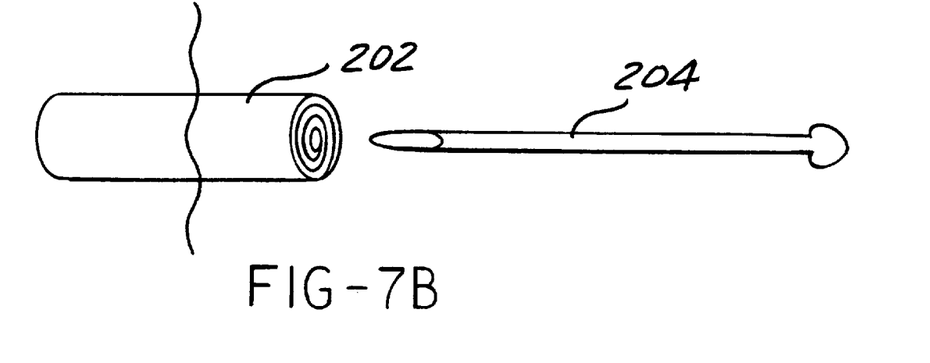

In the above embodiments, gas or expandable compound may be injected into the housing chamber in a number of different ways. One embodiment of this invention provides a self closing valve on the housing top structure, such as at the location of nozzle 154 in FIG. 6 and replacing nozzle 154. Schematic views of an exemplary self closing valve are shown in FIGS. 7a and 7b. As shown in FIG. 7a, the valve includes a sheet of rubber 202 wrapped tightly around a needle or pin 204. When the pin or needle is removed, the valve closes. The valve is opened when a needle or pin 204 is inserted into it, allowing gas or compound to be injected through the needle or pin. The wrapped sheet may be inserted into a hole in the housing lid 140a in place of a nozzle 154.

Figure 8A:
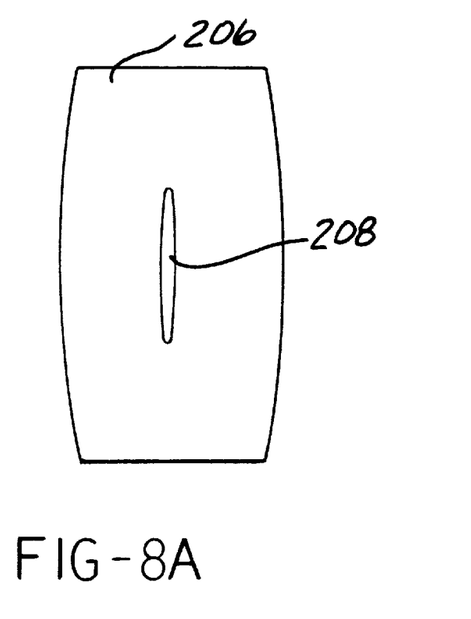
FIGS. 8a and 8b are schematic views of another embodiment of a self closing valve.
Figure 8B:
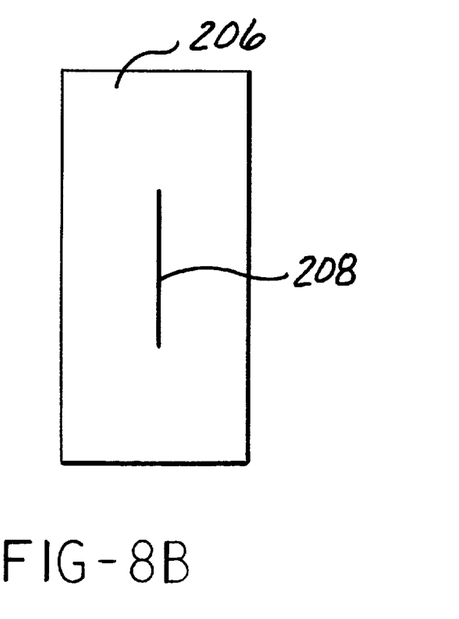

Another embodiment of a self closing valve is shown in FIGS. 8a and 8b, which are schematic views of a rubber sheet 206 with a slit 208 therein. When the slit is open, such as when a pin or needle is inserted therein, a gas or compound may be injected through the pin or needle. When the pin or needle is withdrawn, the valve closes. Housing top 140a may define a hole therein into which is inserted a sheet 206. The valves in FIGS. 7a and 7b, 8a and 8b are known in the art and can be found, for example, in various sports equipment such as basketballs. Another embodiment of this invention provides a small opening in the housing top with a needle valve of the type described above in reference to FIGS. 7a and 7b, 8a and 8b. Gas or expandable compound is injected through the opening. After injection, the opening automatically closes and can be sealed with an epoxy. Still another embodiment of this invention provides a metallic nozzle opening on the housing lid. Gas or expandable compound is injected at the opening. After injection, the nozzle is crimped and soldered together.

The embodiment of the present invention using a heat shrink material may be made by wrapping an electrochemical cell unit with a heat shrink material; and applying heat to the material so that it will shrink (that is, it will contract in at least one dimension of its conformation) and apply compressive force to the cell. The compressed cell can then be placed within a rigid housing structure, if desired.

The spring embodiment of the present invention may be made by inserting a laminar battery into a housing structure, placing a spring element in contact with the laminar battery, and closing the housing so that the spring applies a compressive force to the battery. Alternatively, the spring may be placed into the housing, followed by the insertion of the battery. The housing is optionally sealed under a vacuum or after flushing the housing with an inert gas.

The steps of vacuum sealing the present invention may include either manufacturing the battery assembly in a vacuum chamber or by evacuating the sealed chamber through a valve, opening, or nozzle structures described above, by methods known to those skilled in the art.

Figure 9A:
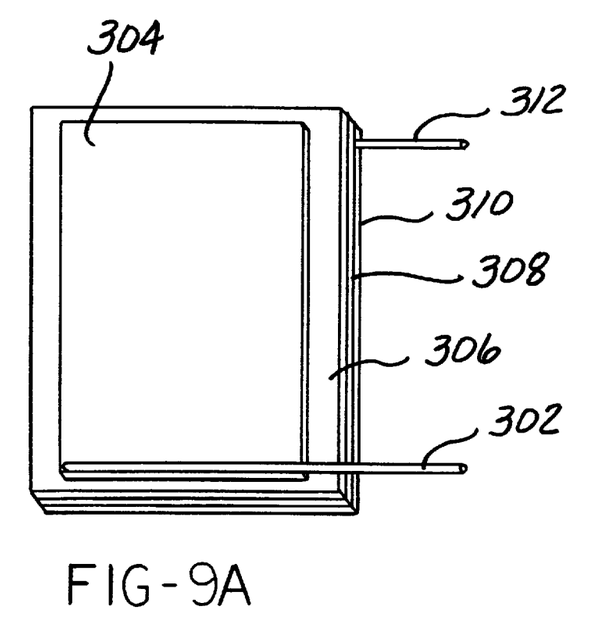
FIG. 9a is a perspective view of a center wire, an anode layer, separator layer, cathode layer, and an insulator layer for forming a cell to illustrate yet another embodiment of the invention.

For some applications a planar battery structure is not desired. For these purposes, it may be advantageous to employ the embodiment of FIGS. 9a and 9b. FIG. 9a is a perspective view of a first, e.g., anode, terminal 302, an anode layer 304, electrolyte or separator layer 306, cathode layer 308, an insulator layer 310 and a second, e.g., cathode terminal 312. Other layers (not shown) which may be included include anode and cathode collector layers.

Figure 9B:
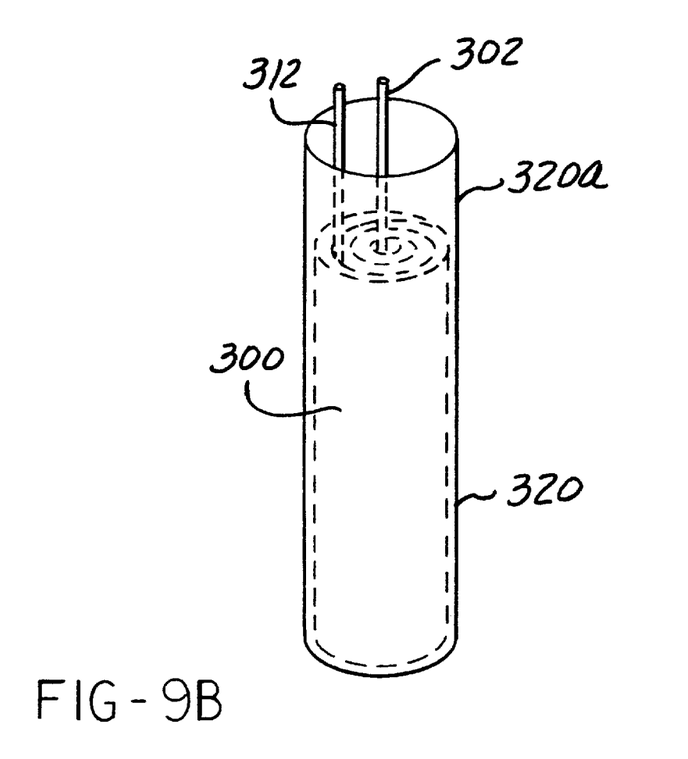

The layered assembly of FIG. 9a is coiled around the first terminal 302 to form a substantially cylindrical cell 300 as shown in FIG. 9b, where the anode, separator and cathode layers each have curved surfaces. The cylindrical cell 300 is inserted into a cylindrical shrinkable material 320 which is longer than the cell 300 at extra portion 320a. The extra portion 320a of the shrinkable material 320 is heat sealed or ultrasonically welded around the terminals so as to seal the cell 300 inside the shrinkable material 320, while permitting the terminals 302, 312 to extend outside the material 320. The cylindrical shrinkable material 320 is shrunk by an appropriate process such as heating, to apply compressive pressure and force on the battery cell 300, to thereby enhance physical contact between the different layers of the cell 300.

It is to be understood that modifications and changes to the preferred embodiments of the invention herein described can be made without departing from the spirit and scope of the invention. For example, it is to be understood that the present invention would work for packaging batteries including multiple cell units, as well as for batteries including a single cell unit, such as those shown in the figures. It is also to be understood that the spring embodiments described in FIGS. 4, 5 and 6 may be constructed with the spring element placed below the cell unit, and with or without using a floating panel structure. Reference to the following claims should be made to determine the scope of the claimed invention.

We claim:

1. A battery package comprising:
    a laminar battery having an anode layer, a cathode layer, and a separator layer between the anode and cathode layers; and
    a layer of heat shrink material surrounding and in contact with at least one of said layers of the laminar battery, the heat shrink material having been heated to apply compressive force to enhance physical contact between the anode layer, separator layer, and cathode layer.

2. The battery package of claim 1 further comprising a rigid planar member adjacent the laminar battery and within the heat shrink material.

3. The battery package of claim 1 further comprising a housing with a chamber therein containing the compressed laminar battery.

4. The battery package of claim 3 wherein the chamber is sealed with respect to the environment.

5. The battery package of claim 4 wherein the housing includes a self-closing valve.

6. The battery package of claim 4 wherein the housing includes a metallic nozzle.

7. The battery package of claim 4 wherein the housing includes an opening to the housing chamber and a plug for closing the opening.

8. The battery package of claim 1 wherein the laminar battery is coiled about a terminal such that the anode, separator, and cathode layers each have curved surfaces.

9. A battery package comprising:
    a laminar battery having an anode layer, a cathode layer, and a separator layer between the anode and cathode layers;
    a layer of heat shrink material surrounding and in contact with the laminar battery, the heat shrink material having been heated to apply compressive force to enhance physical contact between the anode layer, separator layer, and cathode layer;
    a housing with a chamber therein containing the compressed laminar battery, wherein the chamber contains the compressed laminar battery; and
    a spring element contained in the chamber, the spring element applying a compressive force to the laminar battery to insure contact between the anode, separator, and cathode layers.

10. A battery package comprising:
    a container with a closable chamber therein;
    a laminar battery contained in the chamber, the battery having, sequentially, an anode layer, a separator layer, and a cathode layer, wherein the laminar battery further includes a heat shrink material around the battery such that the heat shrink material compresses the battery; and
    a spring element contained in the chamber, the spring element applying a compressive force to the laminar battery to insure contact between the anode, separator, and cathode layers.

11. The battery package of claim 10 wherein the container includes a self-closing valve which provides access to the chamber.

12. The battery package of claim 10 wherein the container includes a metallic nozzle which provides access to the chamber.

13. The battery package of claim 10 wherein the container includes an opening to the chamber and a plug for closing the opening.

14. The battery package of claim 10 further comprising a floating panel within the chamber, the floating panel being interposed between the spring element and the laminar battery.

15. The battery package of claim 10 where the spring element is selected from the group consisting of a coil spring, a leaf spring, a polymer foam spring, an inflatable spring, and a valve washer spring.

16. The battery package of claim 10 wherein the spring element is electrically nonconductive.

17. A battery package comprising:
    a laminar battery having an anode layer, a cathode layer, and a separator layer between the anode and cathode layers; and
    a layer of material placed under tension, while surrounding and in contact with at least one of said layers of the laminar battery, for applying compressive pressure to hold the laminar battery together and to enhance contact between the layers, wherein the layer of material is a heat shrink material capable of contracting in at least one dimension of a three-dimensional conformation in response to application of heat.

18. A battery package comprising:
    a laminar battery having an anode layer, a cathode layer, and a separator layer between the anode and cathode layers; and
    a layer of material placed under tension, while surrounding and in contact with at least one of said layers of the laminar battery, for applying compressive pressure to hold the laminar battery together and to enhance contact between the layers, the layer of material placed under heat-induced tension.

19. The battery package of claim 18 further comprising: the layer of material placed under heat-induced tension.

20. The battery package of claim 18 further comprising:
    at least one rigid panel layer in contact with the laminar battery such that, when the layer of material is placed in tension around the enclosed rigid panel layer and laminar battery, the at least one rigid panel layer limits compressive forces of the layer of material on the laminar battery to a desired compression and promotes electrical contact between the layers.

21. The battery package of claim 18 further comprising a closable package enclosing the laminar battery, the package being sealed after closure.

22. The battery package of claim 21 further comprising the package flushed with an inert gas before sealing the closed package.

23. The battery package of claim 18 further comprising:
    a spring element providing compressive force to the laminar battery, the compressive force enhancing contact between the layers of the laminar structure.

24. The battery package of claim 23 further comprising a panel structure interposed between the laminar battery and the spring element.

25. The battery package of claim 23 wherein the spring element is selected from the group consisting of a coil spring, a leaf spring, an inflatable air spring, a polymer foam spring, and a valve washer spring.

26. A battery package comprising:

a lithium ion electrochemical cell inserted into a heat shrink material, the lithium ion electrochemical cell including, sequentially, an anode layer, a separator layer, and a cathode layer; and the heat shrink material in contact with at least one of said layers of the cell having had sufficient heat applied thereto such that the material shrinks to apply compressive force to the lithium ion electrochemical cell, the compressive force providing enhanced contact between the layers of the lithium ion electrochemical cell.

27. The battery package of claim 26 further comprising the lithium ion electrochemical cell inserted into a container.

28. The battery package of claim 27 further comprising the container sealed to enclose the chamber.

29. The battery package of claim 28 further comprising a spring element placed in the chamber prior to sealing the chamber, the spring element applying a compressive force to the lithium ion electrochemical cell.

30. The battery package of claim 26 further comprising:

a layered lithium ion electrochemical cell, the lithium ion electrochemical cell including at least one electrode terminal, and a laminar structure including, sequentially, an anode layer, a separator layer, and a cathode layer;

the laminar structure coiled about the electrode terminal to produce a cylindrical cell structure; and the cylindrical cell structure inserted into a cylindrical heat shrink material.

* * * * *